(12) United States Patent
Kang

(10) Patent No.: US 6,577,567 B2
(45) Date of Patent: Jun. 10, 2003

(54) METHOD AND APPARATUS FOR FOCUS CONTROL OF AN OPTICAL DISK DRIVE

(75) Inventor: Byung Gyoo Kang, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 09/800,924

(22) Filed: Mar. 8, 2001

(65) Prior Publication Data

US 2001/0021147 A1 Sep. 13, 2001

(30) Foreign Application Priority Data

Mar. 13, 2000 (KR) ........................................ 2000-12403

(51) Int. Cl.⁷ ................................................. G11B 7/00
(52) U.S. Cl. ................................. 369/44.27; 369/44.32; 250/201.5
(58) Field of Search ........................... 369/44.27, 44.28, 369/44.29, 44.32, 44.35, 44.36; 250/201.5

(56) References Cited

U.S. PATENT DOCUMENTS 5,363,357 A * 11/1994 Niwayama ................ 369/44.29
5,768,227 A * 6/1998 Baba ........................ 369/44.28

* cited by examiner

Primary Examiner—Muhammad Edun
(74) Attorney, Agent, or Firm—Birch, Stewart, Kolasch & Birch, LLP

(57) ABSTRACT

A method and apparatus for focus control of an optical disk drive is disclosed. The method for focus control in accordance with the present invention changes focus servo loop characteristics when the optical pickup moves rapidly to perform track search operations so that the vibration of the objective lens is effectively attenuated, thereby allowing stable focus control and high-speed access capability.

20 Claims, 5 Drawing Sheets

*Conventional Art*

METHOD AND APPARATUS FOR FOCUS CONTROL OF AN OPTICAL DISK DRIVE

BACKGROUND OF THE INVENTION

1. Field of the Invention

The present invention relates to a method and apparatus for focus control of an optical disk drive that provides stable focus control performance in the case of rapid pickup movement.

2. Description of the Related Art

When data recorded in a particular area on an optical disk is requested, rough and fine search operations are performed in sequence. The rough search operation is to move the optical pickup near to the target track by applying a large drive voltage to the sled motor moving the optical pickup. If the optical pickup approaches the target position by the rough search, the fine search operation begins. The optical spot is precisely positioned on the target track by the fine search operation.

In the case where the optical pickup moves rapidly for accessing the target track, the objective lens installed in the optical pickup is likely to vibrate due to rapid movement and as a result the focus error tends to increase abruptly during rough search operations as shown in (c) of FIG. 1. Generally, the focus servo loop is designed so that the axial vibration of the disk at the disk rotation frequency (for example 100 Hz) may be sufficiently attenuated by increasing the loop gain at the frequency, as shown in FIG. 2.

However, such a design scheme increases phase lag at the frequency range 1~2 KHz as shown in FIG. 3. Since the vibration of the objective lens belongs to the frequency range, the overall focus servo loop may be unstable during rough search operations due to the increased phase lag. At the worst, the overall focus servo loop diverges to be interrupted. To prevent the problem, the speed of the optical pickup should be limited during rough search operations, which is the major obstacle to implementation of high-speed access systems.

SUMMARY OF THE INVENTION

It is an object of the present invention to provide a method for focus control of an optical disk drive that allows for stable focus control performance in the case of track search operations.

The apparatus for focus control of an optical disk drive in accordance with the present invention comprises a driving unit to rotate the optical disk, a signal detecting unit to detect signals recorded on the optical disk, a focus servo unit to focus the signal detecting unit on the rotating optical disk in accordance with set operating characteristics, and a control unit to change the operating characteristics of the focus servo unit depending upon whether the signal detecting unit is reproducing recorded signals or traversing tracks.

The method for focus control of an optical disk drive in accordance with the present invention comprises the steps of rotating the optical disk, compensating the axial vibration of the rotating optical disk with focus servo loop characteristics initially set, and modifying the focus servo loop characteristics and performing a rough search operation to rapidly move the optical pickup if access to a target position is requested.

In addition, this focus control method and apparatus changes focus servo loop characteristics for a feature of each section of radial path of a disk, thereby also resolving a problem that a moving speed of an optical pickup is restrained due to vibration of an objective lens, which results in improvement of access speed and stable rapid search.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENT

In order that the invention may be fully understood, a preferred embodiment thereof will now be described with reference to the accompanying drawings.

Figure 4:
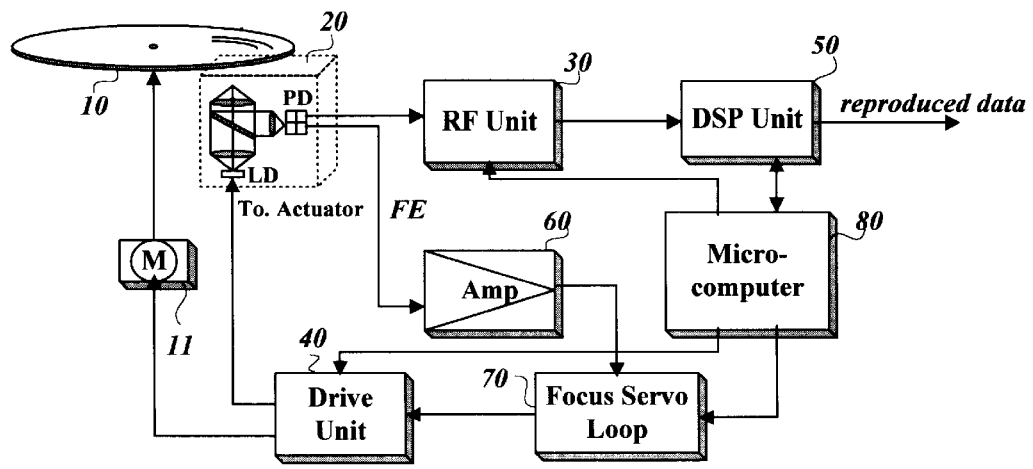
FIG. 4 is a block diagram of an optical disk drive embodying the present invention.

FIG. 4 shows an optical disk drive in which the present invention may be advantageously embodied, comprising a spindle motor 11 for rotating an optical disk 10, an optical pickup 20 for reproducing recorded signals from the optical disk 10, an R/F unit 30 for equalizing and shaping the RF signals reproduced by the optical pickup 20, a drive unit 40 for driving the spindle motor 11 and the actuator installed in the optical pickup 20, a digital signal processing (DSP) unit 50 for processing the binary data stream received from the R/F unit 30 to retrieve original digital data, an amplifier 60 for amplifying the focus error signal outputted by the optical pickup 20, a focus servo loop 70 for focus control using the amplified focus error signal, and a microcomputer 80 for supervising overall operation of the drive system.

Figure 5:
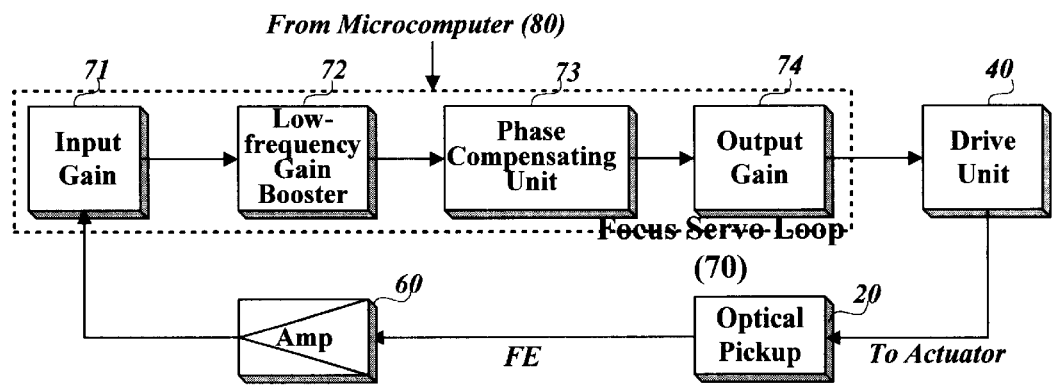
FIGS. 5 and 6 are diagrams of the detailed structure of the focus servo loop in FIG. 4.
Figure 6:
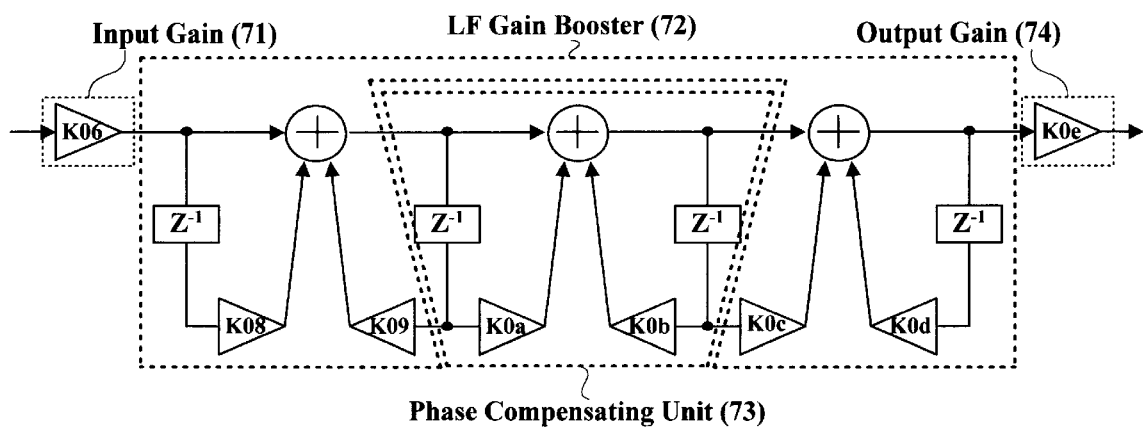

FIG. 5 shows the internal structure of the focus servo loop 70 in detail. It comprises an input gain 71 for amplifying the input signal, a low-frequency gain booster 72 for boosting the low-frequency components of the input signal, a phase compensating unit 73 for providing phase compensation, and an output gain 74. Since the focus servo loop 70 is implemented as a digital filter as shown in FIG. 6, the characteristic of each unit can be easily modified by changing the associated filter coefficients, which is carried out by the firmware for the microcomputer 80.

Figure 7:
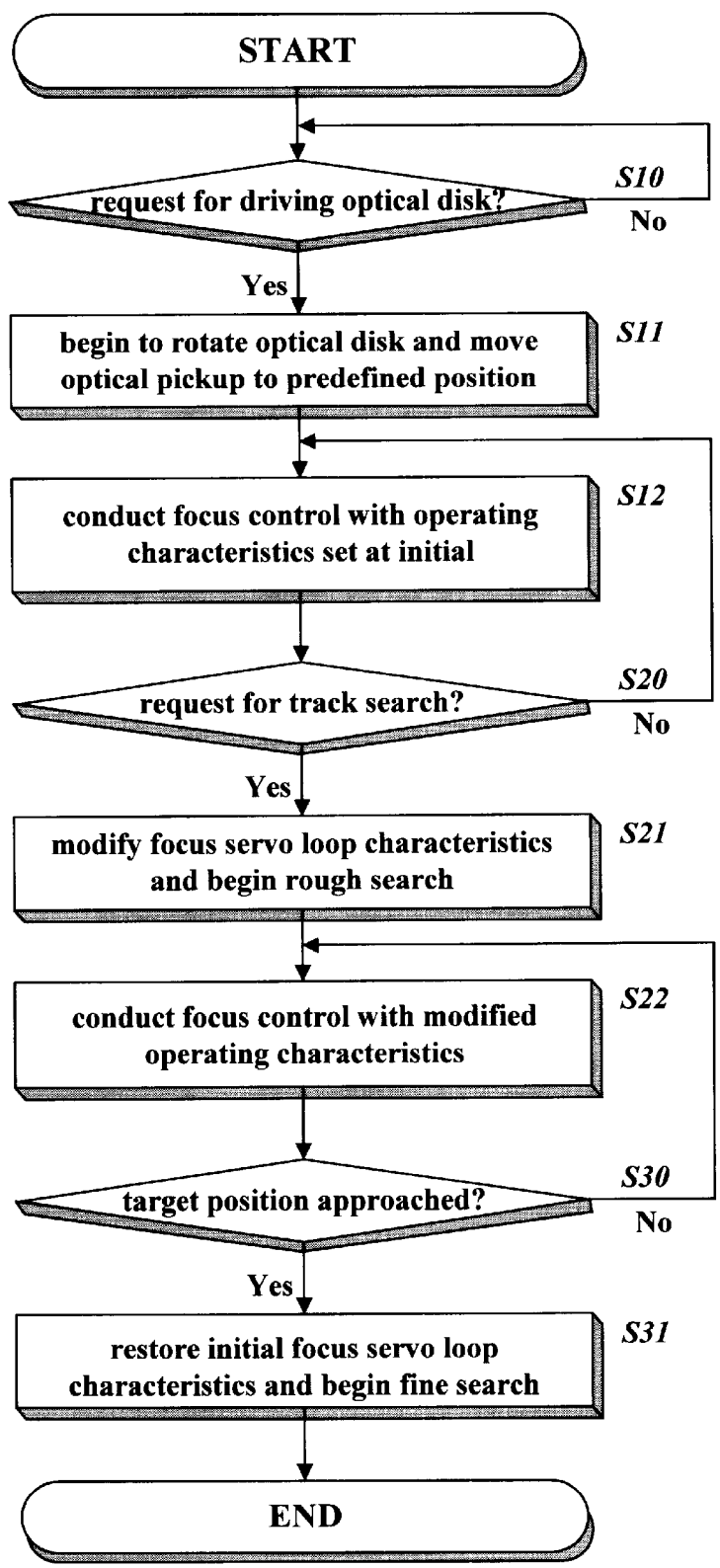
FIG. 7 is a flow chart of the method for focus control of an optical disk drive in accordance with the present invention.

FIG. 7 shows a flow chart of the focus control method in accordance with an embodiment of the present invention, which will be explained in detail with reference to FIGS. 4 and 5.

When the optical disk 10 is inserted (S10), the microcomputer 80 begins to rotate the optical disk 10 with constant angular velocity by driving the spindle motor 11 through the driver 40.

Then, the microcomputer 80 issues a command to move the optical pickup 20 to a predefined position on the optical disk 10 (S11) and activates focus and tracking servo for the optical pickup 20 to retrieve recorded data (S12).

Figure 1:
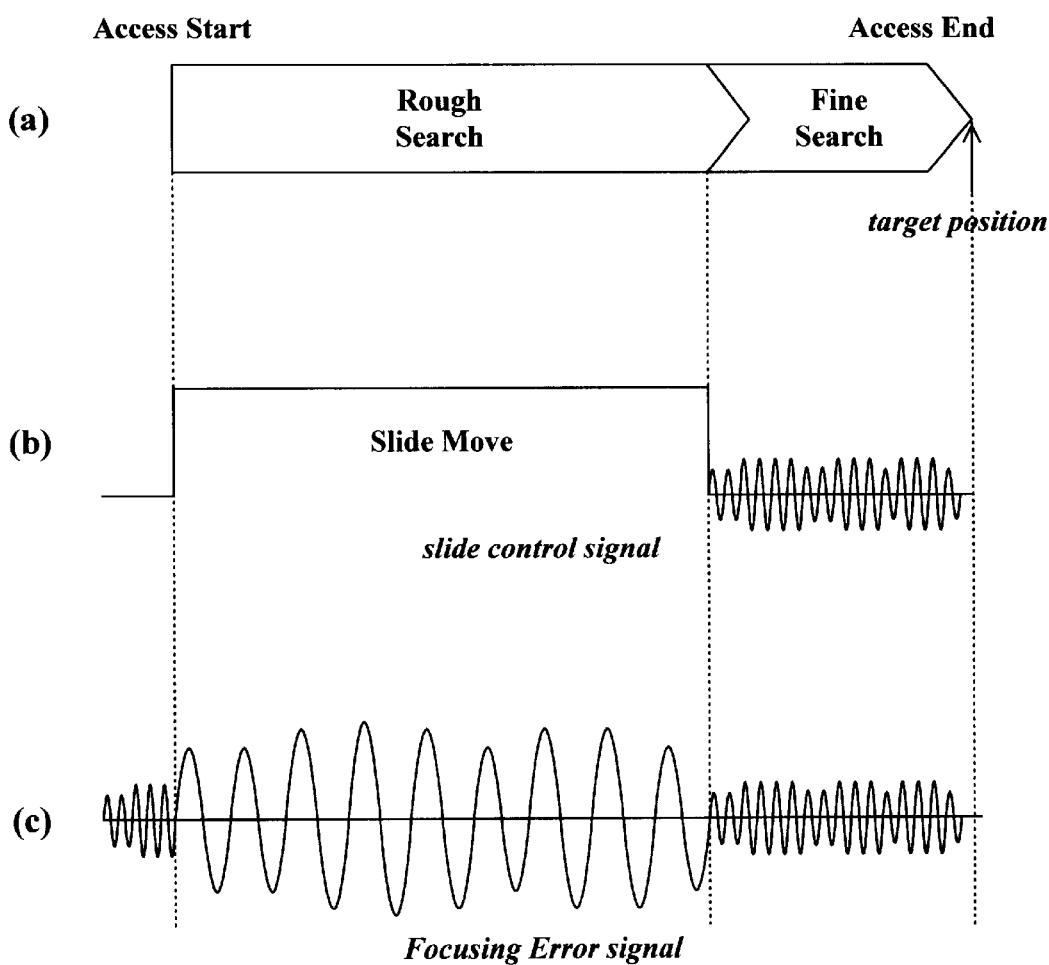
FIG. 1 is a waveform of focus error signal and slide control signal in the case of search operations.
Figure 2:
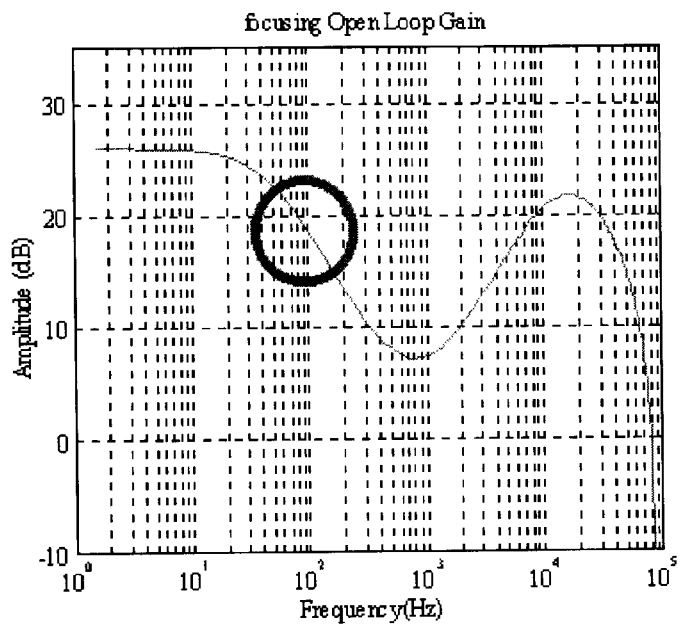
FIGS. 2 and 3 are magnitude and phase plots of the focus servo loop with characteristics to be set initially.
Figure 3:
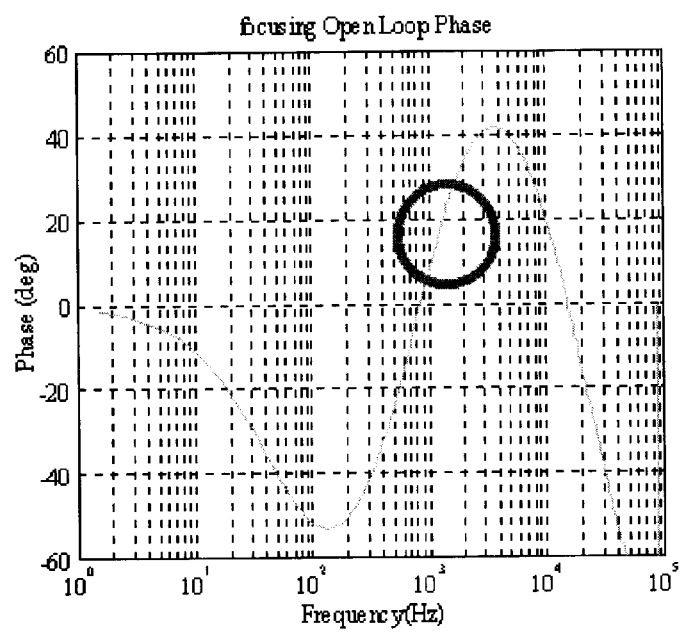

The amplifier 60 amplifies the focus error signal generated by the optical pickup 20 and the amplified focus error signal is used as the input to the focus servo. The focus servo loop is designed so that the focus error remains within an allowable error bound despite the axial vibration of the optical disk 10 and a sufficient stability margin is guaranteed. The coefficients of the focus servo are set by the microcomputer 80. FIG. 2 shows a frequency response plot of the focus servo loop where the servo loop has the highest gain at around 100 Hz to effectively attenuate the axial vibration of the optical disk 10.

If a track search operation is requested (S20), the microcomputer 80 begins a rough search operation to move the optical pick near to the target track. To this end, the microcomputer 80 first modifies the characteristics of the focus servo loop by changing the focus servo filter coefficients K06 through K0e shown in FIG. 6 (S21). This is because the focus servo loop for normal data read-out operations is not appropriate for the rough search operation by which the objective lens is subject to a great amount of vibration. The focus servo loop for the rough search operation is designed so that the phase compensating unit 73 has less phase lag in the frequency range 1~2 KHz for a stable search operation.

In addition, a feature may be different at several parts of a radial path of an optical disk. Accordingly, the microcomputer 80 can also change appropriate coefficients together with the above modification such that they have adequate values to compensate for bad effects caused by the particular feature of each part.

Figure 8:
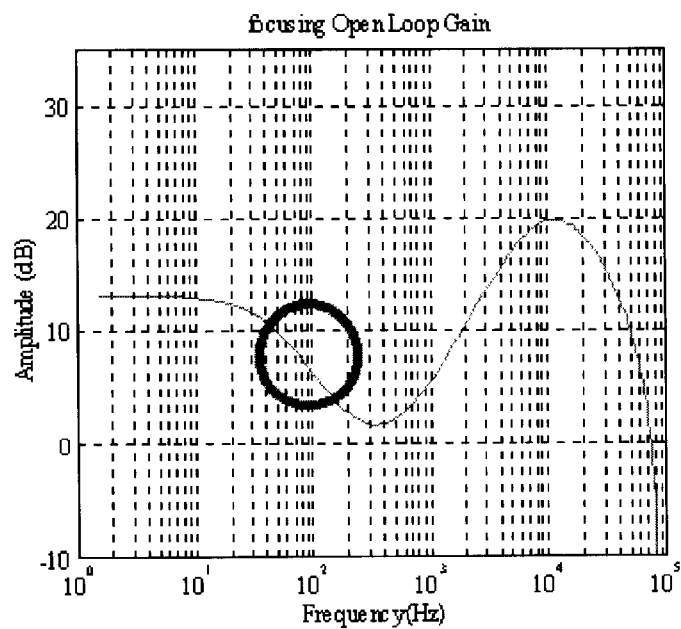
FIGS. 8 and 9 are magnitude and phase plots of the focus servo loop used in the system shown in FIG. 4.
Figure 9:
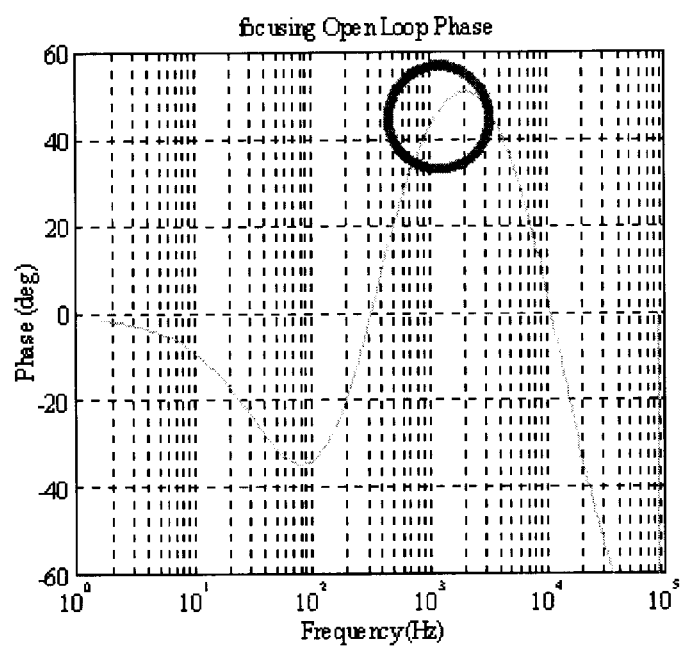

The focus servo loop designed for the rough search operation is more sensitive to the frequency range of the focus error signal generated by the vibration of the objective lens and therefore responds rapidly to suppress such vibration (S22). FIGS. 8 and 9 show the magnitude and phase plots of such a focus servo loop. It is shown that the gain decreases at around 100 Hz decreases and the phase lag in the vibration frequency range 1~2 KHz decreases.

When the optical pickup 20 approaches the target track with the vibration of the objective lens being effectively suppressed (S30), the microcomputer 80 stops the rough search operation and starts the fine search operation to precisely locate the target track. Before starting the fine search operation, the microcomputer 80 restores the initial focus servo loop characteristics by changing the filter coefficients to the original values (S31). Therefore, the axial vibration of the optical disk 10 can be attenuated during the fine search operation.

The method for focus control of an optical disk drive in accordance with the present invention provides sufficient phase compensation in the course of search operations by modifying the focus servo loop characteristics appropriately for each operation mode, thereby allowing high-performance focusing control. The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for focus control of an optical disk drive, comprising the steps of:

rotating the optical disk;

moving an optical pickup to a predefined position on the optical disk;

compensating the axial vibration of the rotating optical disk at said predefined position with focus servo loop characteristics set initially;

requesting a track seek operation to access a target position;

modifying the focus servo loop characteristics to compensate vibration of an objective lens while the optical pickup is moving and performing a rough search operation to rapidly move the optical pickup to said target position; and restoring the initial servo loop characteristics.

2. The method set forth in claim 1, wherein modifying the focus servo loop characteristics further comprises a step for performing phase compensation for the focus error signal generated in the course of the optical pickup movement with the modified focus servo loop characteristics.

3. The method set forth in claim 1, wherein said modifying step modifies the focus servo loop characteristics to compensate a feature of each part of a radial path of the optical disk, each part having a different feature.

4. The method set forth in claim 1, wherein restoring the initial focus servo loop characteristics is followed by performing a fine search operation for precisely locating the target position after the rough search operation is completed.

5. An apparatus for focus control of an optical disk drive, comprising:

a driving unit to rotate the optical disk;

a signal detecting unit to detect signals recorded on the optical disk;

a focus servo unit to performing focusing said signal detecting unit on the rotating optical disk in accordance with operating characteristics initially set; and a control unit to change the initially set operating characteristics of said focus servo unit when said signal detecting unit is reproducing recorded signals or traversing tracks and to return operating characteristics to initially set values when reproducing recorded signals or traversing tracks is completed.

6. The apparatus set forth in claim 5, wherein said focus servo unit consists of a digital filter.

7. The apparatus set forth in claim 5, wherein said control unit sets the operating characteristics of said focus servo unit so that the phase lag of the focus error components of the frequency range of 1~2 KHz decreases, the focus error components being generated when said signal detecting unit traverses tracks.

8. The apparatus set forth in claim 7, wherein said control units sets the operating characteristics of said focus servo unit so that the.phase lag of the focus error components of the frequency range of 1~2 KHz decreases only in the course of rough search operations of said signal detecting unit.

9. The apparatus set forth in claim 5, wherein said control unit increases gain for the focus error components of the frequency of 100 Hz while said signal detecting unit performs normal data read-out operations.

10. The apparatus set forth in claim 5, wherein said focus servo unit comprising:

an input gain amplifying a focusing error signal according to preset gain;

a low-frequency gain booster boosting low-frequency components of the signals outputted from said input gain;

a phase compensating unit compensating delayed phase of the focusing error signal; and an output gain amplifying the boosted signals.

11. The apparatus set forth in claim 5, wherein said control unit changes the operating characteristics of said focus servo unit to compensate a feature of each part of radial path of the optical disk, each part having different feature.

12. A method for focus control of an optical disk drive, comprising the steps of:

rotating the optical disk;

conducting focus servo operation for the rotating disk based on characteristics initially set;

determining whether access to a target track is requested or not; and modifying focus servo loop characteristics to compensate vibration of an objective lens while conducting target track searching operation; and restoring initial focus servo loop characteristics when target track searching operation is completed.

13. The method set forth in claim 12, wherein said modifying step further comprises the step of compensating the phase of a focus error signal detected while an optical pickup is moved.

14. The method set forth in claim 12, wherein said modifying step modifies the focus servo loop characteristics to compensate a feature of each part of a radial path of the optical disk, each part having a different feature.

15. The method set forth in claim 12, wherein said modifying step modifies the focus servo loop characteristics when a rough search operation is done.

16. The method set forth in claim 15, wherein said modifying step restores the focus servo loop characteristics to original characteristics which have been set prior to the rough search operation when the rough search operation is done.

17. A method for focus control of an optical disk drive, comprising the steps of:

receiving a track seek operation command to access a target position;

temporarily modifying the focus servo loop characteristics set previously to compensate vibration of an objective lens while the optical pickup is moving to said target position; and restoring the previous servo loop characteristics.

18. The method set forth in claim 17, wherein temporarily modifying the focus servo loop characteristics further comprises a step for performing phase compensation for the focus error signal generated in the course of the optical pickup movement with the temporarily modified focus servo loop characteristics.

19. The method set forth in claim 17, wherein said temporarily modifying step modifies the focus servo loop characteristics to compensate a feature of each part of a radial path of the optical disk, each part having a different feature.

20. The method set forth in claim 17, wherein restoring the previous servo loop characteristics is followed by performing a fine search operation for precisely locating the target position after a rough search operation is completed.

* * * * *